United States Patent [19]

Mills et al.

[11] 4,430,560

[45] Feb. 7, 1984

[54] ELECTRICAL HEATING APPARATUS OVERHEAT PROTECTION CIRCUITS

[75] Inventors: Edwin R. Mills, Raleigh; Ernest L. Elmore, Smithfield, both of N.C.

[73] Assignee: Fieldcrest Mills, Inc., Eden, N.C.

[21] Appl. No.: 329,391

[22] Filed: Dec. 10, 1981

Related U.S. Application Data

[63] Continuation-in-part of Ser. No. 184,200, Sep. 5, 1980, abandoned.

[51] Int. Cl.³ .............................................. H05B 1/02
[52] U.S. Cl. ................................. 219/505; 219/212; 219/508; 219/510
[58] Field of Search ............... 219/505, 504, 506, 508, 219/212, 549, 528, 494; 307/252 Q, 241

[56] References Cited

U.S. PATENT DOCUMENTS

| | | | |
|---|---|---|---|
| 3,462,585 | 8/1969 | Somers | 219/505 |
| 3,683,151 | 8/1972 | Mills et al. | 219/212 |
| 4,198,562 | 4/1980 | Mills et al. | 219/212 |

*Primary Examiner*—M. H. Paschall
*Attorney, Agent, or Firm*—Bell, Seltzer, Park & Gibson

[57] ABSTRACT

An electrical heating apparatus, and particularly a bedcover preferably in the form of a blanket, protected against an overheating condition and in which electrical current flow through a heating element is controlled by a pair of gate controlled bidirectional semiconductor switches electrically connected to one another in series and in back-to-back orientation. The gates of the semiconductor switches are connected through a temperature sensitive capacitor which triggers the semiconductor switches from a conductive to a nonconductive state in response to the sensing of an overheating condition.

8 Claims, 7 Drawing Figures

ELECTRICAL HEATING APPARATUS OVERHEAT PROTECTION CIRCUITS

RELATED APPLICATION

This application is a continuation-in-part of co-pending application Ser. No. 184,200, filed Sept. 5, 1980, now abandoned.

FIELD AND BACKGROUND OF INVENTION

Electrical heating appliances, and particularly electrical heating apparatus in the form of bedcovers such as electric blankets, are popular with consumers and have represented a commercially significant area of development. In part for those reasons, it is significant, in such apparatus, to provide for protection against an overheating condition. Many arrangements for protecting against an overheating condition are known from previous work and at least some of such arrangements have achieved significant commercial success.

Due in part to the significance of such electrical heating apparatus with consumers, agencies which certify to the safety of such apparatus insist upon the use of electricl circuitry which is effective for protecting a consumer even in the event of failure of a component of the circuitry.

While "solid state" or semiconductor circuits such as those illustrated in prior U.S. Pat. Nos. 3,356,825, 3,588,446 and 4,198,562 have achieved some success, attainment of a desired result of both a smooth bedcover structure and failsafe circuitry has presented some difficulty. More particularly, approval by certifying agencies is denied where failure of any given circuit component can possibly result in the electrical heating apparatus failing with electrical current applied to an electrical heating element, due to the risk of an occurrence of overheating.

BRIEF DESCRIPTION OF INVENTION

It is an object of the present invention to achieve protection against an overheating condition in an electrical heating apparatus through the provision of circuitry which provides semiconductor switches which interrupt the supply of electrical current in response to the sensing of an overheating condition and in which the semiconductor switches are connected for effectively blocking current flow in the event of failure of a circuit component. In realizing this object of the present invention, a pair of gate controlled bidirectional semiconductor switches are electrically connected to one another and to an electrical heating means in a specific manner.

Yet a further object of the present invention is to protect an electrical heating apparatus, such as a bedcover in the form of a blanket, against an overheating condition through the use of overheat protection means including a temperature sensitive impedance means thermally coupled to an electrical heating element for sensing an occurrence of an overheating condition of the electrical heating element. In realizing this object of the present invention, pairs of conductors electrically separated one from the other by a temperature sensitive dielectric material are electrically connected to the gates of bidirectional semiconductor switches so as to control triggering of the semiconductor switches from a conductive to a nonconductive state in respone to the sensing of an overheat condition.

BRIEF DESCRIPTION OF DRAWINGS

Some of the objects of the invention having been stated, other objects will appear as the description proceeds, when taken in connection with the accompanying drawings, in which—

DETAILED DESCRIPTION OF INVENTION

While the present invention will be described hereinafter with particular reference to the accompanying drawings, it is to be understood at the outset of this description that persons skilled in the applicable arts will be able to modify the specific arrangements here described and shown while continuing to achieve the desired result of this invention. Accordingly, the description and illustrations are to be taken as broad, teaching disclosures directed to persons skilled in the appropriate arts, and not as restricting the scope of the present invention.

Figure 1:
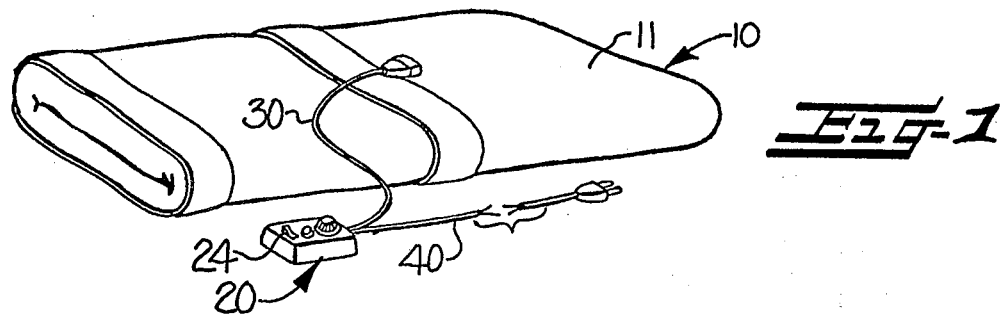
FIG. 1 is a perspective view of an electrical heating apparatus in accordance with the present invention, in the form of a bedcover and prticularly an electrical blanket.

As illustrated in FIG. 1, the heating apparatus of the present invention preferably takes the form of a bedcover, in particular a blanket generally indicated at 10. A bedside control housing 20 is provided, connected with components within the bedcover 10 by an appropriate conductor cable 30 and with a source of electrical current through a power cord 40. Readers familiar with prior U.S. Pat. No. 4,198,562 will be aware that the circuitry may be divided in alternative manners as there disclosed. To any extent necessary for a full understanding of the possible range of constructions for a bedcover in accordance with the present invention, the disclosure of that prior patent is incorporated by reference hereinto.

Figure 3:
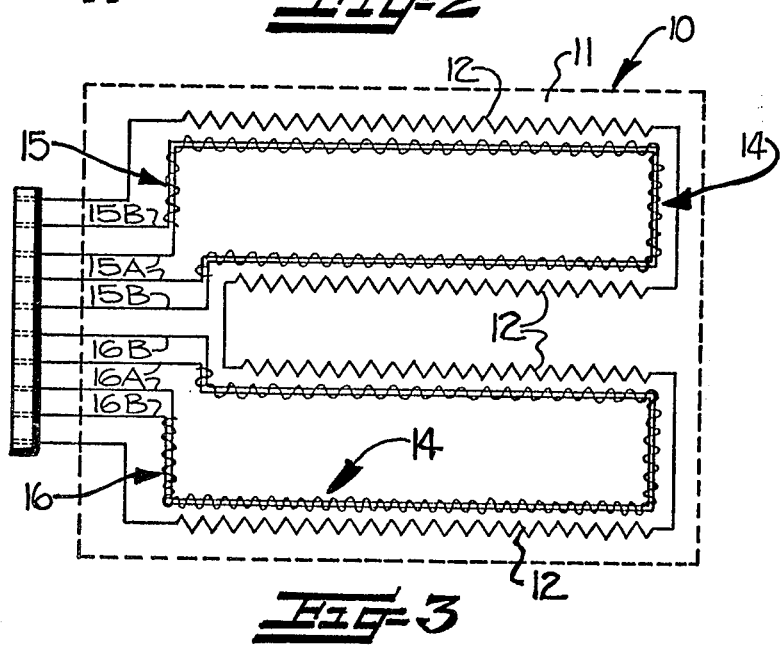
FIG. 3 is a schematic diagram of electrical circuitry incorporated within the blanket of FIG. 1.

Referring now more particularly to FIG. 3, the bedcover 10 is there schematically illustrated as a textile blanket shell 11. An electrical resistance heating element means 12 is disposed in and extends through channels formed in the blanket shell 11. Overheat protection means are provided and include temperature sensitive impedance means generally indicated at 14 and thermally coupled to the electrical heating element 12 for sensing the occurrence of an overheating condition in the electrical heating element. Preferably, the temperature sensitive impedance means comprises a pair of sensor wires 15, 16. Each sensor wire is constructed generally in accordance with Gordon U.S. Pat. No. 3,222,497 where the sensor comprises two conductors separated from each other by a flexible material having a negative temperature coefficient of resistance. In the present application each sensor comprises a pair of conductors 15A, 15B, 16A, 16B normally electrically separated one from the other by a temperature sensitive dielectric material having a negative temperature coefficient of resistance, whereby the resistivity of the material decreases as its temperature increases. The conductors 15A, 15B, 16A, 16B are coupled to one another within the respective sensor wires or temperature sensitive impedance means 15, 16.

Within the control housing 20 is provided a comfort control means operable between conductive and non-conductive states which, in the illustrated embodiment, varies the intervals of time during which successive complete cycles of alternating electrical current are conducted through a bimetallic thermostatic switch 21 and a compensating heater 22. Alternatively, the comfort control may take such other forms as are disclosed in U.S. Pat. No. 3,588,446 mentioned above. Additionally, an on-off switch 24 is provided to give a user control over heating by the apparatus.

The control housing 20 additionally contains a pair of gate controlled bidirectional semiconductor switches 25, 26 electrically connected to one another in series and controlling conductance of electrical current through the heating element 12 in response to the sensing of an overheating condition by the sensor wires 15, 16. The gate controlled bidirectional semiconductor switches 25, 26 used in the apparatus of the present invention are of the type which has been identified by some persons by the term "quadrac" and are available from various manufacturers. The quadrac is a bistable semiconductor device triggered through an integral diode and which can block voltage in either direction, conduct current in either direction, and be triggered for conducting current in either direction by the application of gate signals. The basic switch structure typically includes a terminal $MT_1$ and an adjacent gate terminal G located on one side of the device, and a terminal $MT_2$ on the opposite side. The region between the terminals $MT_1$ and $MT_2$ is configured as a pair of parallel semiconductor switches. The schematic symbol for the switch is composed of complementary triangular symbols. The gate terminal G is indicated by a line emanating from the $MT_1$ side of the schematic symbol at an angle with respect to the line which represents the $MT_1$ terminal and which includes, within the envelope for the semiconductor switch device, complementary triangular symbols. Terminal $MT_1$ is the reference point for measurement of voltages in currents at the gate terminal G and at the opposite terminal $MT_2$. The $MT_1$ terminal side of the switch is often referred to as the "front" of the device and the $MT_2$ terminal side is regarded as the "back" of the device. For ease of understanding, this terminology is used in the present disclosure and claims in describing the orientation of the switches.

Figure 2:
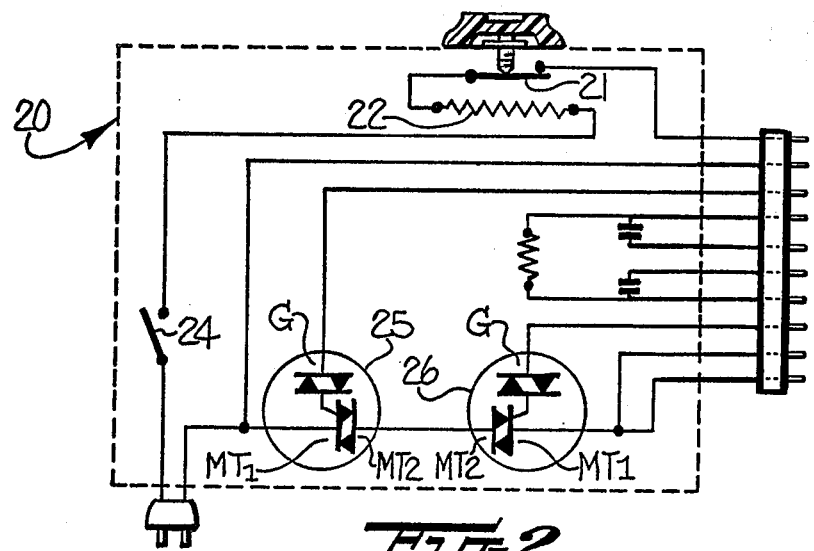
FIG. 2 is a schematic diagram of control circuitry used in conjunction with the blanket of FIG. 1.

As illustrated in FIG. 2, the switches 25, 26 are electrically connected to one another in series and in back-to-back orientation. Further, means are provded for electrically connecting the respective gates of the semiconductor switches 25, 26 through respective ones of the temperature sensitive impedance means 15, 16. As so arranged, each of the swiches normally is triggered into a conductive state to permit conductance of substantially full cycles of alternating electrical current through the heating element 12. However, upon a change in impedance in the respective sensor wires, the switches 25, 26 are triggered from a conductive to a nonconductive state in response to the sensing of an overheating condition and conductance of electrical current through the heating element 12 is interrupted. By reason of the back-to-back orientation of the switches 25, 26 and the manner of interconnection of the gates with the sensor wires, conductance of electrical current through the heating element 12 will be interrupted due to failure of either of the switches in an open condition. Further, overheat protection is not lost in the event of failure of one of the switches in the shorted condition.

Figure 4:
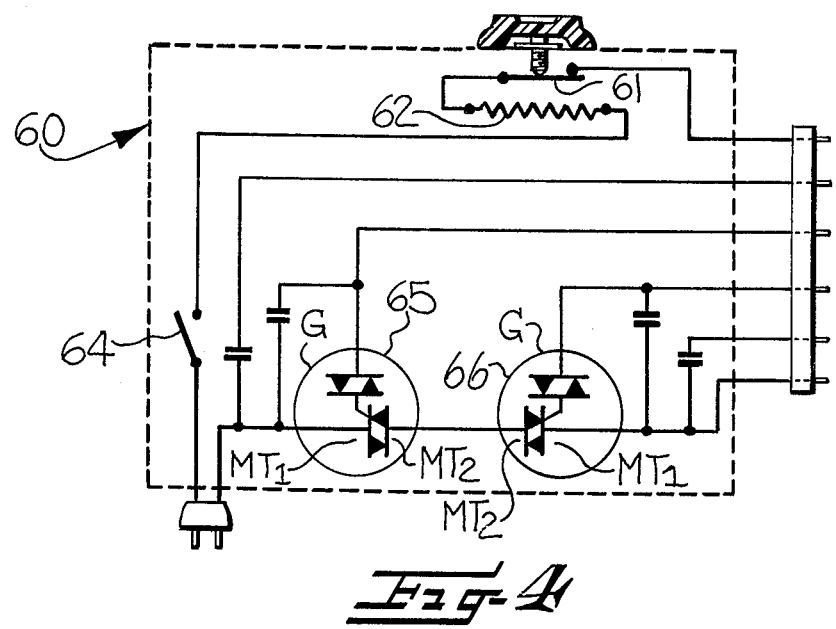
FIG. 4 is a schematic diagram similar to FIG. 2 and showing another form of control circuitry used in conjunction with a blanket such as that of FIG. 1.
Figure 5:
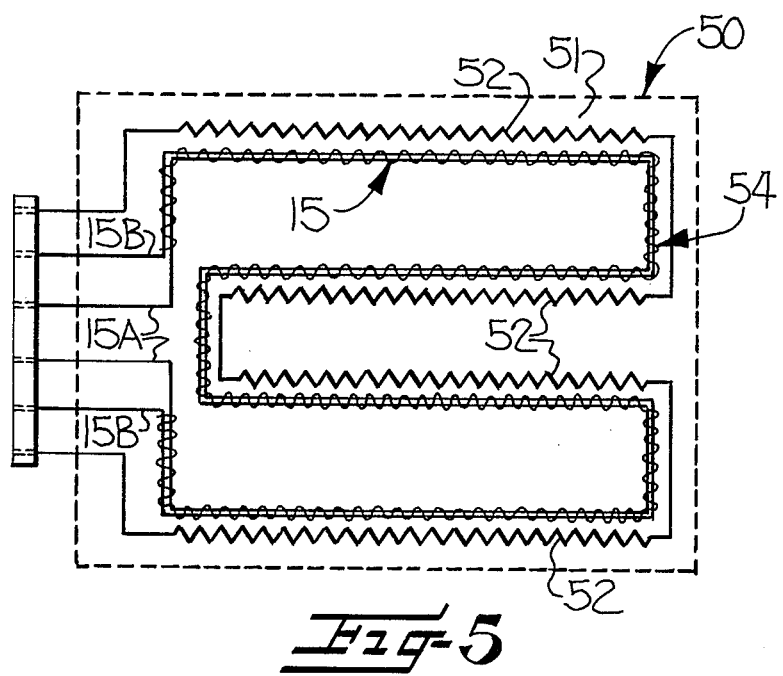
FIG. 5 is a schematic diagram similar to FIG. 3 of electrical circuitry incorporated within a blanket to be used with the control circuitry of FIG. 4.
Figure 6:
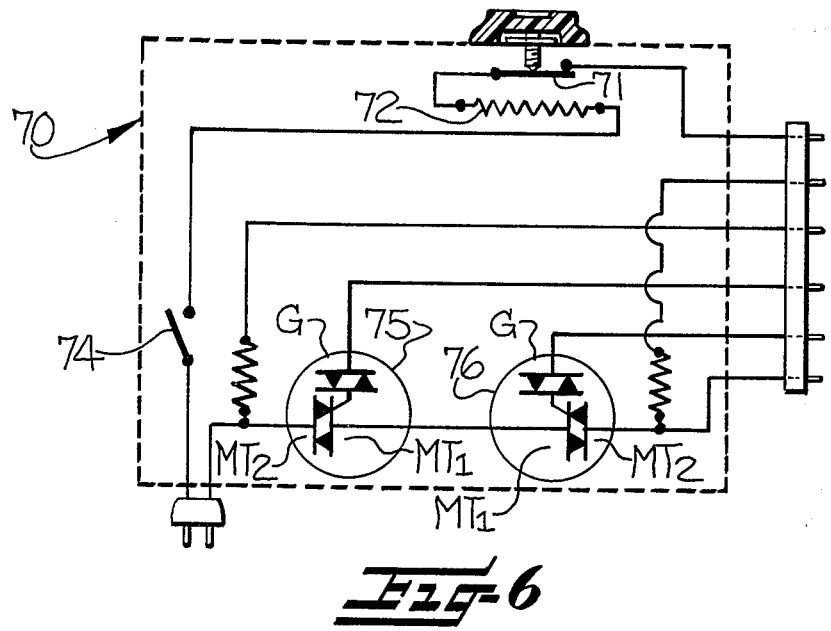
FIGS. 6 and 7 are schematic diagrams similar to FIGS. 2 and 4 of alternative control circuitry used in conjunction with the blanket of FIGS. 5 and 1.
Figure 7:
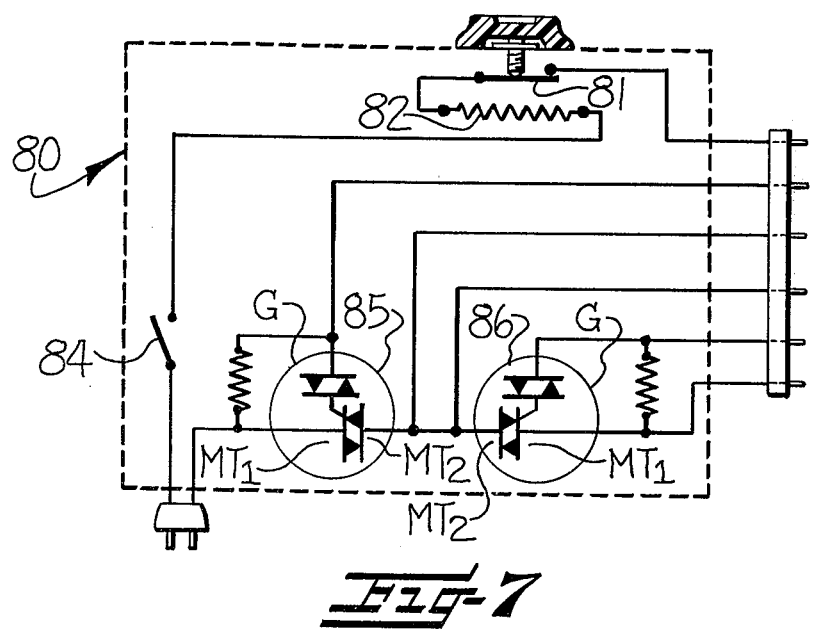

Alternative circuit arrangements achieving comparable operation are shown in FIGS. 4 through 7, to which attention is now directed. In FIG. 4, reference characters similar in order to those applied to FIG. 2 have been used in a 60 series. In FIGS. 6 and 7, comparable reference characters of the 70 series and 80 series are used. In FIG. 5, reference characters generally corresponding to those of FIG. 3 are employed, of a 50 series. To the extent that the reference characters employed identify common components and elements which are described in detail hereinabove, such description will not hereinafter be duplicated. Instead, attention will be given to the distinctions among the circuit arrangements proposed.

In particular, it will be noted that the blanket of FIG. 5 includes only a single set of sensor wires 54. In such an arrangement, and in order to achieve the characteristic of maintaining overheat protection in the event of failure of one of the switches 65, 66 of an associated control in a shorted condition, the electrical connections of the gate terminals G of the switches 65, 66 include capacitance elements as part of the conduction paths. With that proviso, the operation of the electrical blanket using the circuits of FIGS. 4 and 5 is comparable to that described above with reference to FIGS. 2 and 3.

The blanket circuit of FIG. 5 may additionally be employed with control circuits as shown in FIGS. 6 and 7, where the sets of switches 75, 76 and 85, 86 are connected front-to-front as well as back-to-back. In the circuit arrangement of FIG. 6, the electrical coupling of the gate of each one of the semiconductor switches to another terminal of the same one of the semiconductor switches is completed by the provision of resistances. In the circuit of FIG. 7, the switches 85, 86 are connected back-to-back, with the resistances being relocated in order to accomplish the desired electrical coupling.

In the drawings and specification, there has been set forth a preferred embodiment of the invention, and although specific terms are employed, they are used in a generic and descriptive sense only and not for purposes of limitation.

That which is claimed is:

1. An electrical heating apparatus protected against an overheating condition and comprising electrical heating means for generating heat upon flow of electrical current therethrough, overheat protection means including temperature sensitive impedance means having a negative temperature coefficient and being thermally coupled to said electrical heating means for sensing the occurrence of an overheating condition therein, a pair of gate controlled bidirectional semiconductor switches electrically connected to one another in series, means electrically connecting said pair of semiconductor switches to said heating means for controlling the flow of electrical current thereto, and means electrically coupling the gate of each one of said semiconductor switches to another terminal of the same one of said semiconductor switches through said temperature sensitive impedance means for triggering the semiconductor switches from a conductive to a nonconductive state in response to the sensing of an overheating condition by said temperature sensitive impedance means, said semiconductor switches being triggered to a nonconductive state by a change in resistivity of said temperature sensitive impedance means.

2. Apparatus according to claim 1 wherein said temperature sensitive impedance means comprises a plurality of pairs of conductors with the conductors of each pair electrically separated one from the other by a temperature sensitive dielectric material and positioned in close proximity to said electrical heating means for sensing the occurrence of an overheating condition therein.

3. Apparatus according to claim 1 wherein said temperature sensitive impedance means comprises a plurality of pairs of conductors with the conductors of each pair electrically separated one from the other by a temperature sensitive dielectric material and being coupled to one another in series and electrically connected to a respective gate of a respective one of said semiconductor switches and positioned in close proximity to said electrical heating means for sensing the occurrence of an overheating condition therein.

4. Apparatus according to claim 1 wherein said means electrically coupling the gate to another terminal comprises a conductor connecting the gate of each said semiconductor switch to the front of the same said semiconductor switch.

5. Apparatus according to claim 1 wherein said temperature sensitive impedance means comprises a single pair of conductors, each of which is electrically separated from the other by a temperature sensitive dielectric material and positioned in close proximity to said electrical heating means for sensing the occurrence of an overheating condition therein.

6. Apparatus according to one of claim 2 or claim 5 wherein said semiconductor switches are electrically connected to one another in back-to-back orientation.

7. Apparatus according to one of claim 2 or claim 5 wherein said semiconductor switches are electrically connected to one another in front-to-front orientation.

8. An electrically heated bedcover protected against an overheating condition and comprising a bedcover, electrical heating means in said bedcover for generating heat upon flow of electrical current therethrough, overheat protection means including a pair of temperature sensitive impedance means having a negative temperature coefficient and being located in said bedcover for sensing the occurrence of an overheating condition in said bedcover, a pair of gate controlled bidirectional semiconductor switches electrically connected to one another in series and in back-to-back orientation, conductor means electrically connecting said pair of semiconductor switches to said heating means for controlling the flow of electrical current thereto, and means electrically connecting a respective gate of a respective one of said semiconductor switches to the front of the same said semiconductor switch through a respective one of said temperature sensitive impedance means for triggering the semiconductor switches from a conductive to a nonconductive state in response to the sensing of an overheating condition by said temperature sensitive impedance means.

* * * * *